(12) United States Patent
Maini et al.

(10) Patent No.: US 10,479,298 B2
(45) Date of Patent: Nov. 19, 2019

(54) INTELLIGENT DETERMINATION AND USAGE OF ENERGY IN ENERGY SYSTEMS

(71) Applicant: MAHINDRA ELECTRIC MOBILITY LIMITED, Bangalore (IN)

(72) Inventors: Chetan Kumar Maini, Bangalore (IN); Prakash Ramaraju, Bangalore (IN); Vinten D Diwakar, Bangalore (IN); Pallavi Kar, New Delhi (IN); Kartik Gopal, Bangalore (IN); Nagendra Babu Sathyanarayana, Bangalore (IN)

(73) Assignee: MAHINDRA ELECTRIC MOBILITY LIMITED, Bangalore (IN)

( * ) Notice: Subject to any disclaimer, the term of this patent is extended or adjusted under 35 U.S.C. 154(b) by 1220 days.

(21) Appl. No.: 14/479,406

(22) Filed: Sep. 8, 2014

(65) Prior Publication Data
US 2016/0068121 A1 Mar. 10, 2016

(51) Int. Cl.
*B60R 16/03* (2006.01)

(52) U.S. Cl.
CPC .................................. *B60R 16/03* (2013.01)

(58) Field of Classification Search
CPC .................................................. B60R 16/03
See application file for complete search history.

(56) References Cited

U.S. PATENT DOCUMENTS

| 2009/0027056 A1* | 1/2009 | Huang | B60L 58/12 324/439 |
| 2010/0094496 A1* | 4/2010 | Hershkovitz | B60L 3/12 701/22 |
| 2013/0138279 A1* | 5/2013 | Shi | B60L 1/00 701/22 |

\* cited by examiner

*Primary Examiner* — Rexford N Barnie
*Assistant Examiner* — Elim Ortiz
(74) *Attorney, Agent, or Firm* — Hauptman Ham, LLP

(57) ABSTRACT

Disclosed herein are a method and a system for automatic and intelligent determination and usage of internal reserve energy in an energy system associated with a vehicle. The system processes pre-configured inputs and inputs collected in real time, generates a distribution optimization profile which possesses information on values of different control parameters required to keep selected components operational, by considering energy availability in the energy storage system. Further, the system distributes energy to selected components, based on the distribution optimization profile. Further, the system verifies whether the selected distribution optimization profile matches a safe use profile and if not, automatically overrides settings associated with the distribution optimization profile to ensure safe driving of the vehicle, with at least a minimum comfort level.

10 Claims, 7 Drawing Sheets

US 10,479,298 B2

INTELLIGENT DETERMINATION AND USAGE OF ENERGY IN ENERGY SYSTEMS

The present Continuation-in-Part application is based on, and claims priority from, US National Phase Application Number 13391569 for PCT/IN2010/000548, filed on 21 Feb. 2012, the disclosure of which is hereby incorporated by reference herein.

TECHNICAL FIELD

The embodiments herein relate to energy systems and, more particularly, to automated determination and usage of energy, particularly for automobiles.

BACKGROUND

Energy Storage Systems such as batteries are integral parts of automobiles. They are used for storing energy that can be consumed by one or more Energy Consumption Systems of a vehicle. An Energy Storage System finds a wide variety of applications, such as powering an Uninterrupted Power Supply system and at least partially propelling vehicles among others. Generally, the extent to which the energy stored in an Energy Storage System can be consumed is restricted to a certain level to ensure that the life and performance of the Energy Storage System is optimized.

In an automobile, different components may have different energy requirements. Further, criticality of the function being handled by each component/subsystem may be different. A normal energy management system distributes power to all components of the vehicle. In certain scenarios, the energy storage of the vehicle may dry up when the user is actually travelling somewhere, affecting critical functions of the vehicle. In case of an electric vehicle, drying up of the battery may result in complete system shutdown. Battery management systems, to some extent, help reduce energy consumption. However, none of the existing systems are capable of efficiently managing energy usage based on requirements of the user.

SUMMARY

In view of the foregoing, an embodiment herein provides a method for determining amount of internal reserve energy that is available in an energy storage system. Capacity of the energy storage system is determined by the Reserve Energy Estimation Engine and then information related to historical data relating to the energy storage system is collected, from which state of health of the energy storage system is determined. Further, current state of the energy storage system is determined by a Mission Priority and Decision Management Engine, and then, the amount of internal reserve energy available below a threshold level is computed based on at least one of the determined capacity, state of health, and current state of the energy storage system by the Reserve Energy Estimation Engine.

Embodiments further disclose an energy usage optimization module for determining amount of internal reserve energy that is available in an energy storage system. The energy usage optimization module configured for determining capacity of the energy storage system using a Reserve Energy Estimation Engine. The energy usage optimization module further collects historical data relating to the energy storage system using the Reserve Energy Estimation Engine, and by processing the historical data, determines state of health of the energy storage system using the Reserve Energy Estimation Engine. Further, current state of the energy storage system is determined using a Mission Priority and Decision Management Engine, after which the amount of internal reserve energy available below a threshold level is computed based on at least one of the determined capacity, state of health, and current state of the energy storage system using the Reserve Energy Estimation Engine.

Embodiments further disclose a method for controlling internal reserve energy usage in an energy system. Amount of the internal reserve energy in the energy system is determined by a Reserve Energy Estimation System. Further, at least an energy distribution mode is selected by the Reserve Energy Estimation System, wherein the energy distribution mode comprises energy estimation for at least a propulsion requirement or an auxiliary load requirement. Further, the selected energy distribution mode is verified by a Mission Priority and Decision Making Engine, and then the internal reserve energy is distributed based on the energy distribution mode by a Control Strategy Engine.

Embodiments further disclose an energy usage optimization module for controlling internal reserve energy usage in an energy system. The energy usage optimization module is configured for determining the amount of the internal reserve energy in the energy system using a Reserve Energy Estimation System. The energy usage optimization module further selects at least an energy distribution mode using the Reserve Energy Estimation System, wherein the energy distribution mode comprises energy estimation for at least a propulsion requirement or an auxiliary load requirement. The energy usage optimization module verifies the energy distribution mode using a Mission Priority and Decision Making Engine, and then, distributes the internal reserve energy based on the energy distribution mode using a Control Strategy Engine.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

Figure 1:
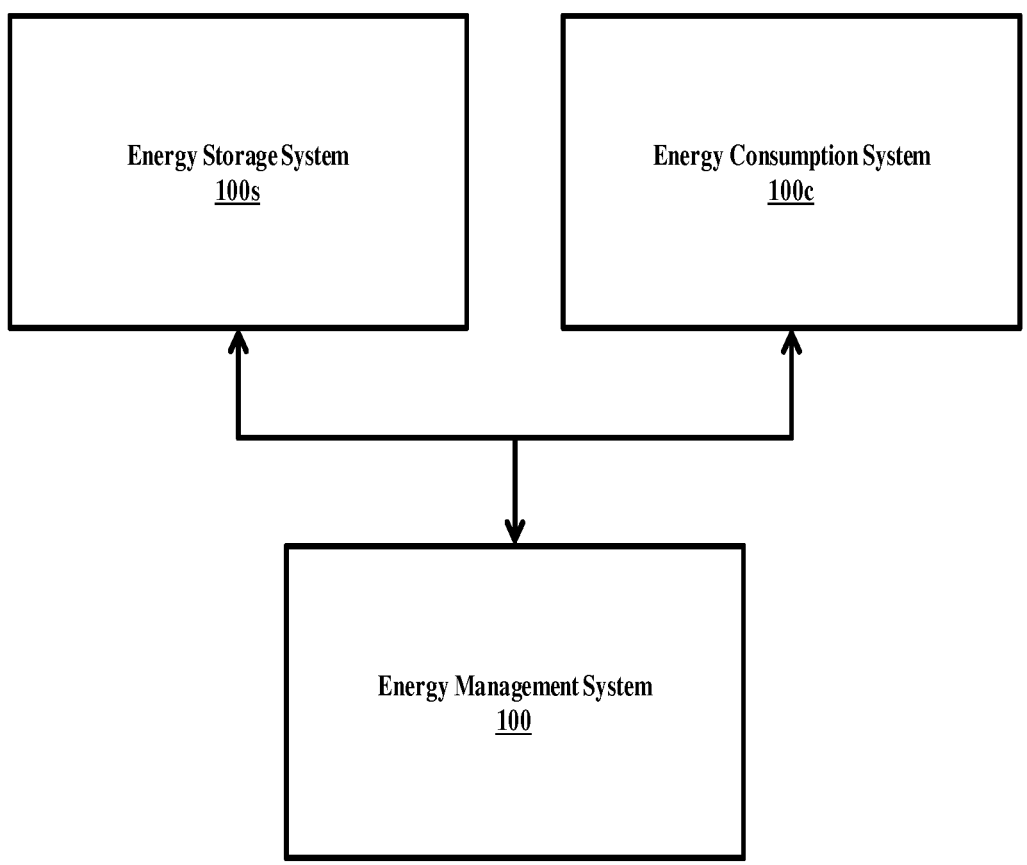
FIG. 1 illustrates the energy system which constitutes an Energy Management System, an Energy Storage System, and Energy Consumption System as disclosed in the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method and system for intelligent energy distribution in vehicles by prioritizing energy distribution requirements. Referring now to the drawings, and more particularly to FIGS. 1 through 6, where similar reference characters denote corresponding features consistently throughout the figures, there are shown embodiments.

FIG. 1 illustrates a block diagram of the Energy System, as disclosed in the embodiments herein. The Energy System comprises an Energy Management System 100, an Energy Storage System 100s and an Energy Consumption System 100c. The Energy Management System 100 is responsible for the determination of an amount of energy at any point in time or in real time within the Energy Storage System 100s, and how this available energy is used for the smooth running of the Energy Consumption System 100c.

The Energy Consumption System 100c which consumes the energy stored in the Energy Storage System 100s may be one or more of drive train, motor controller, cabin climate control, subsystem climate control, charging system, dashboard display, car access system, drive motor, seat climate control, cabin HVAC, add-on heating system, battery heater, battery ventilation, on board charger, safety system, crash sensor, sensing system, temperature sensor, fluid level sensor, and pressure sensor, among others, or combination thereof.

Figure 1A:
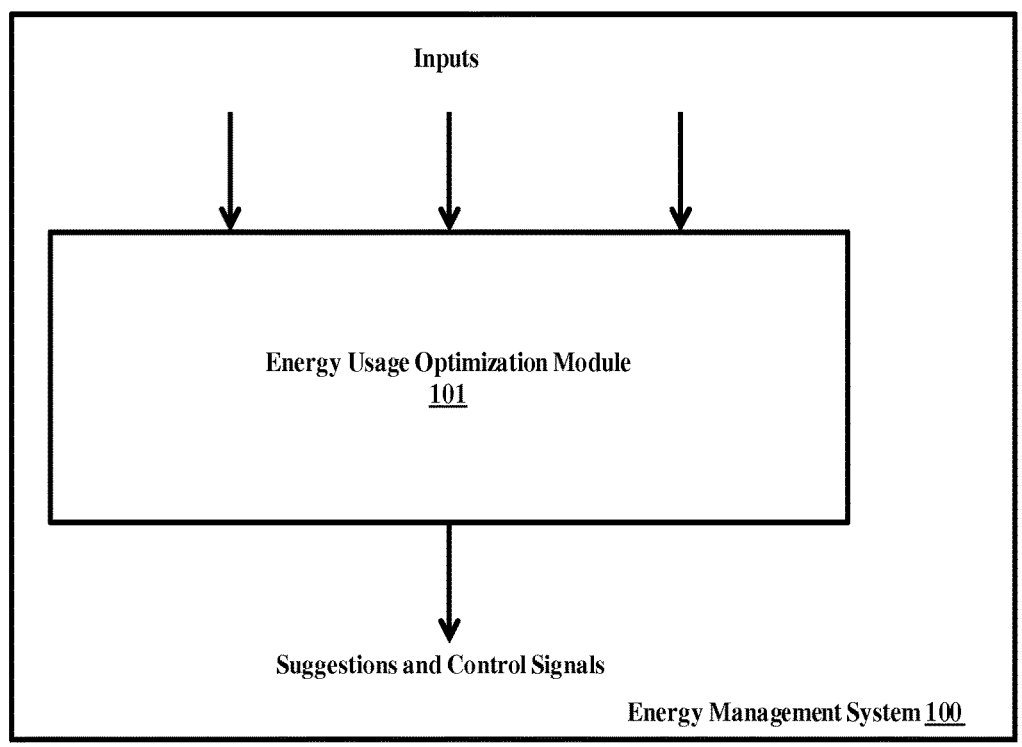
FIG. 1A illustrates a block diagram of the Energy Management System (EMS), as disclosed in the embodiments herein.

FIG. 1A illustrates a block diagram of the Energy Management System (EMS), as disclosed in the embodiments herein. The Energy Management System (EMS) 100 comprises of an energy usage optimization module 101. The energy usage optimization module 101 is connected to various components of the vehicle which are in need of power, such that it can monitor in real time, energy requirements of each of these components. The energy usage optimization module 101 is further connected to an energy storage system 100s of the vehicle such that it can automatically manage and supply energy to selected components, decided as part of an energy optimization process.

The EMS 100 may be configured to monitor an energy storage system 100s that is used to serve energy requirements of the energy system, and determine in real time, amount of internal reserve energy in the energy storage system 100s. The information pertaining to the amount of internal reserve energy in the energy storage system 100s may be then used by the EMS 100 for optimizing energy usage in the energy system such that, the determined amount of internal reserve energy is distributed among different components in need of energy, based on priority of each component, as determined by the EMS 100.

The EMS 100, using the energy usage optimization module 101, provides means for a user to provide inputs to the EMS 100. The user input may be user requirements/preferences, wherein the user can provide instructions as to which component(s) are to be used throughout the journey, which in turn indicates that the energy usage optimization module 101 needs to ensure energy distribution to those components. For example, if the user specifies that infotainment systems should be kept ON throughout the journey, then the energy usage optimization module 101 needs to provide sufficient energy to the infotainment system. In addition to the inputs provided by the user, the energy usage optimization module 101 may automatically collect, different inputs required to perform the real time energy usage optimization using suitable input devices such as sensors. For example, the energy usage optimization module 101 may collect route information from a GPS module associated with the vehicle and use this information for the energy usage optimization process. This adaptive learning capability of the energy usage optimization module 101 helps to perform real time optimization, even if the user's trip plan changes.

By processing the received user inputs and dynamically collected data, along with other inputs (data such as but not limited to amount of energy available in a battery module, and health of the battery), the energy usage optimization module 101 may generate an Energy Distribution Mode. The Energy Distribution Mode may possess information on different components which are chosen to be kept operational and which will be supplied energy, which is decided by processing statically and dynamically collected inputs. Further, corresponding to the Energy Distribution Mode, the energy usage optimization module 101 generates a distribution optimization profile may possess information on values of different parameters required to keep the selected components operational, by considering energy availability in the Energy Storage System 100s. For example, if the energy usage optimization module 101 chooses to keep the air-conditioning (a/c) module operational, and if amount of available energy in the battery is low, then the a/c may be kept ON at a low/medium power level to consume energy. In an embodiment, energy usage optimization module 101 may be configured to consider a threshold value of energy stored in the energy storage system 100s such that below the threshold value, the energy usage optimization module 101 does not consider user preferences in order to determine the Energy Distribution Mode. The energy usage optimization module 101 may be configured to allow consumption of energy from the energy storage system 100s until at least one threshold level is reached. However, even beyond the threshold level, energy will be available in the energy storage system 100s. The energy that is available beyond the threshold level is known as internal reserve energy.

In addition to controlling energy distribution to various components, the energy usage optimization module 101 verifies whether an Energy Distribution Mode that matches user requirements/preferences is safe from energy consumption perspective. If the Energy Distribution Mode is not safe i.e. if the Energy Distribution Mode is found to affect a 'safe' use of the vehicle, then the energy usage optimization module 101 may override the distribution optimization profile and make necessary changes/modifications to ensure a 'safe' transit of the user.

The energy usage optimization module 101 may further provide means for identifying at least one green route, wherein a green route may indicate a route between at least two chosen locations, which provides maximum efficiency in terms of fuel/energy consumption. Based on parameters such as but not limited to the data collected in real time, and data which is statically saved, and the usage history, the energy usage optimization module 101 identifies the green route (s). The energy usage optimization module 101 may further suggest the identified green route to the user, or automatically change settings to choose the green route for travelling.

Figure 2:
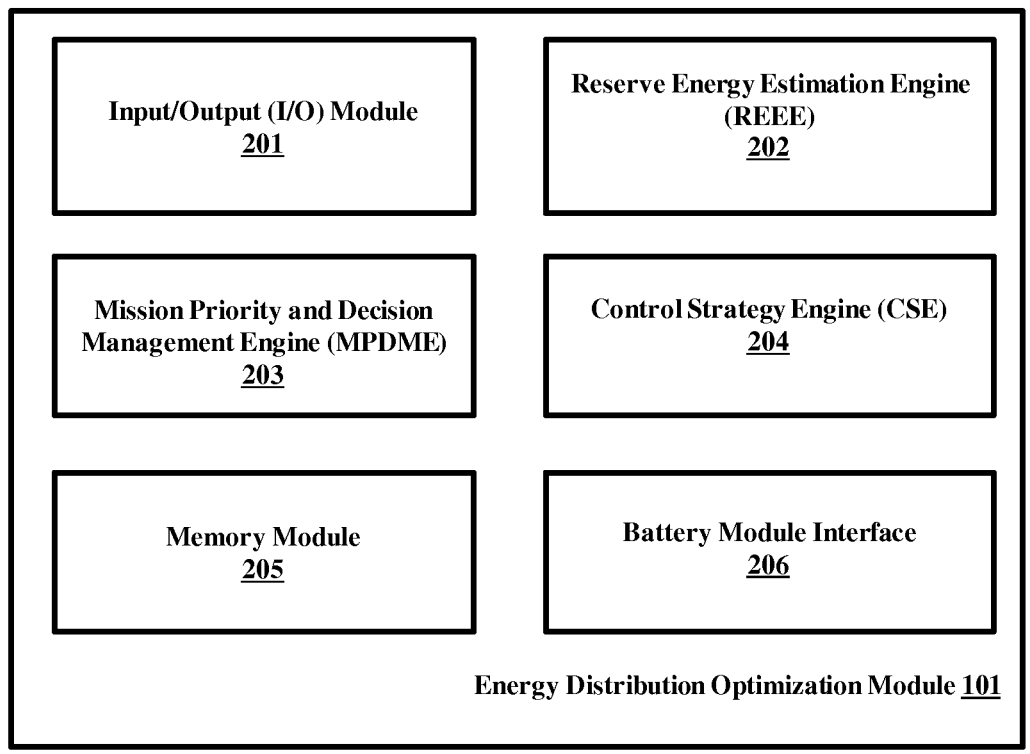
FIG. 2 illustrates a block diagram which shows components of the Energy Management System (EMS), as disclosed in the embodiments herein.

FIG. 2 illustrates a block diagram which shows components of the Energy Management System (EMS), as disclosed in the embodiments herein. The energy usage optimization module 101 further comprises of an input/output (I/O) module 201, a Reserve Energy Estimation System (REEE) 202, a Mission Priority and Decision Management Engine (MPDME) 203, a Control Strategy Engine (CSE) 204, a memory module 205, and a battery module interface 206.

The I/O module 201 may provide options for the user to provide inputs required for the purpose of energy usage optimization. The I/O module 201 may also be connected with various input devices using which the energy usage optimization module 101 may collect certain inputs dynamically, to automatically perform the energy usage optimization. The I/O module 201 may further provide at least one option for the user to communicate with the energy usage optimization module 101 to trigger any action supported by the system and to fetch corresponding output (s) in a suitable format.

The REEE 202, based on input data and configured setting(s), identifies a mode of operation for the vehicle. The REEE 202 may use historical data and tracked parameters to collate data on drive efficiencies and drive patterns, end of drive and beginning of drive state of charge, implied state of health, and current state of the energy storage system 100s. The REEE 202 further comprises of a Virtual vehicle System (VVS) and a Virtual Energy Storage System (VESS). The REEE 202 may collect inputs pertaining to user preference with respect to a preferred mode of operation, from the MPDME 203. The REEE 202 further collects energy consumption details of the vehicle as input. In an embodiment, the REEE 202 uses suitable mechanism(s) that can determine the energy consumption based on the vehicle characteristics (on-board weight, drive train information, auxiliary load information, tire information including information from the Tyre Pressure Monitoring System (TPMS)) and external information (route, grade along the route, traffic along the route, speed limits and speed related information along the route), for the purpose of determining the energy consumption. Further, by processing the user preference information, energy consumption details, and any such information, using the VVS, the REEE 202 determines energy estimation for propulsion requirements, and energy requirements for auxiliary load requirements. The term 'propulsion requirements' may refer to the amount of energy required for the vehicle to safely reach the destination. The term 'auxiliary load requirements' may refer to energy requirements for serving the auxiliary load requirements, wherein auxiliary load requirements may refer to any selected function of the vehicle other than the propulsion requirements, which consumes energy from the battery module. In a preferred embodiment, the propulsion requirements get priority over the auxiliary load requirements. In an embodiment, the propulsion requirements, the auxiliary load requirements, and corresponding energy estimation data may constitute the mode of operation, wherein the propulsion requirements, the auxiliary laod requirements may be arranged in the order of priority. In another embodiment, one of the propulsion requirements, and the auxiliary load requirements, along with corresponding energy estimation data may constitute the mode of operation. The energy estimation inputs may be then processed further using the VESS to determine an energy utilization factor, state of health and state of power.

For example, the mode of operation may be 'Trip', which indicates normal energy requirements of the vehicle and components. In another example, the mode of operation may be 'Turbo', which indicates high energy requirements of the vehicle. When in the trip mode the energy may be distributed without considering any specific priority requirements, in the turbo mode, the core vehicle functions such as but not limited to engine, and electrical components of the vehicle may get higher priority over other components such as infotainment systems. In another embodiment, the mode of operation may be selected by the user, using a suitable interface provided by the I/O module 201. Further, the REEE 202 identifies control parameters associated with the selected mode of operation. In an embodiment, information on the control parameters for different modes of operation supported by the vehicle may be stored in the memory module 205. Based, on the selected mode of operation, the REEE 202 may collect this information from the memory module 205. Further, the REEE 202 generates the distribution optimization profile using the selected mode, and identified control parameters. The distribution optimization profile may then possess information on components for which energy will be provided by the energy usage optimization module 101. The distribution optimization profile may further possess information on amount of energy that will be provided to each of the selected components.

The distribution optimization profile thus generated may be then stored in a database associated with the memory module 205, and may be accessible to the user, anytime in the future. In an embodiment, the user may choose and activate a distribution optimization profile stored in the memory module 205 for at least one selected trip. In another embodiment, the energy usage optimization module 101 may automatically select a particular distribution optimization profile for a journey, by analyzing travel history data stored in the memory module 205.

The MPDME 203 collects information regarding the selected distribution optimization profile as one input from the REEE 202. The MPDME 203 may further collect real time inputs from external and internal components of the I/O module 201. For example, the real time input may be route information collected from a GPS device, or weather information collected using suitable sensors associated with the I/O module 201. The MPDME 203 further verifies whether the selected distribution optimization profile is safe, from real time driving safety perspective. In an embodiment parameters associated with at least one safety rule which is required to govern safe driving conditions of the vehicle, may be pre-configured by an authorized person. If the profile is found to be unsafe, then the MPDME 203 may override settings associated with the selected distribution optimization profile to ensure that the profile matches specified safety rule (s). Further, the MPDME 203 chooses control parameters corresponding to the selected profile. The distribution optimization profile and associated control parameters are then provided as inputs to the Control Strategy Engine 204.

In another embodiment, the MPDME 203 may receive preferences in terms of a preferred mode of operation. The MPDME 203 may further collect information about the mode of operation selected by the REEE 202. The MPDME 203 may be further configured to verify if the user preference and the mode of operation selected by the REEE 202 are in line. If the selected mode of operation is found to be deviating from the user preferences, then the MPDME 203 analyzes extent of deviation. Further, if the deviation is found to be more than a specified value, then the MPDME 203 may, with or without user permission, execute certain pre-configured action(s). The pre-configured action may refer to ending the energy usage optimization, or controlling certain component(s) using the Control Strategy Engine 204, to match the mode of operation with the user preferences.

The Control Strategy Engine 204 is configured to process the inputs received from the MPDME 203, along with data/inputs collected in real time, to prioritize control of components based on needs of the moment. While prioritizing, the Control Strategy Engine 204 may choose amount of energy to be provided to selected components, based on real time requirements and scenarios. The Control Strategy Engine 204 may further decide, by processing input(s) received from the MPDME 203, whether certain component (s) need to be controlled as part of the energy usage optimization, and to match the selected mode of operation with the user preference(s).

Figure 3:
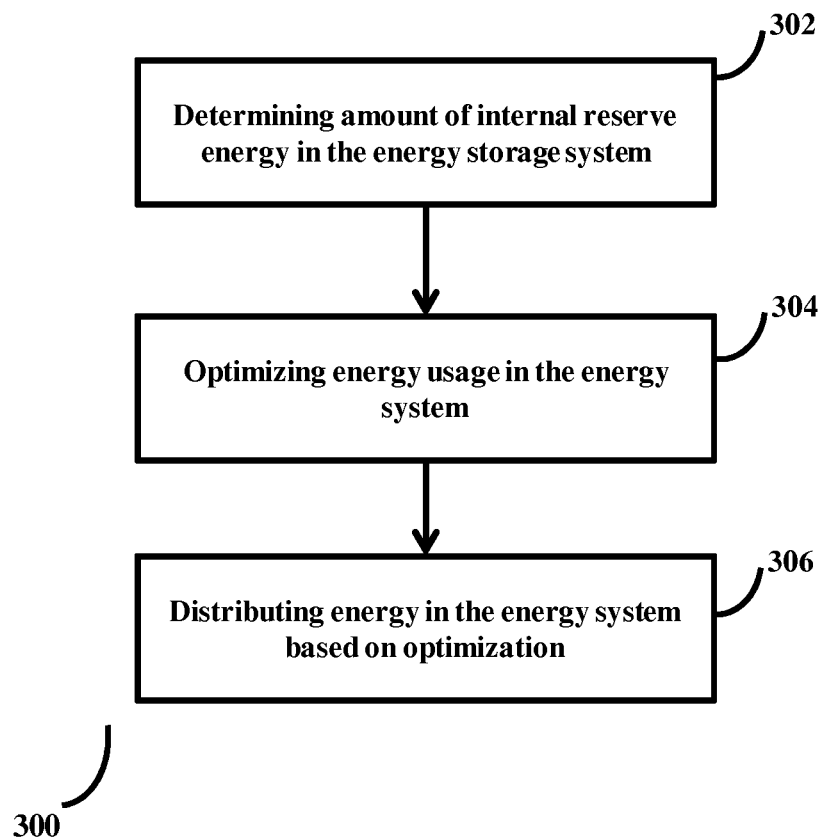
FIG. 3 is a flow diagram which shows different steps involved in the process of optimizing energy usage in an energy system, using Energy Management System (EMS), as disclosed in the embodiments herein.

FIG. 3 is a flow diagram which shows different steps involved in the process of optimizing energy usage in an energy system, using Energy Management System (EMS), as disclosed in the embodiments herein. Optimization of the energy system is done in three stages. In the first stage, the EMS 100, using the Energy usage Optimization Module 101, determines (302) amount of internal reserve energy available in an associated energy storage system 100s.

Further, based on the information pertaining to the amount of internal reserve energy available in the energy storage system 100s, the EMS 100 optimizes (304) energy usage in the energy system. In another embodiment, the EMS 100 optimizes energy usage by generating an Energy Distribution Mode that matches requirements in terms of at least a user preference and a safety criteria.

The EMS 100 further distributes (306) full or selected portions of the internal reserve energy available in the energy storage system 100s among all or selected components of the vehicle, based on the Energy Distribution Mode generated during the energy usage optimization process. The various actions in method 300 may be performed in the order presented, in a different order or simultaneously. Further, in some embodiments, some actions listed in FIG. 3 may be omitted.

Figure 4:
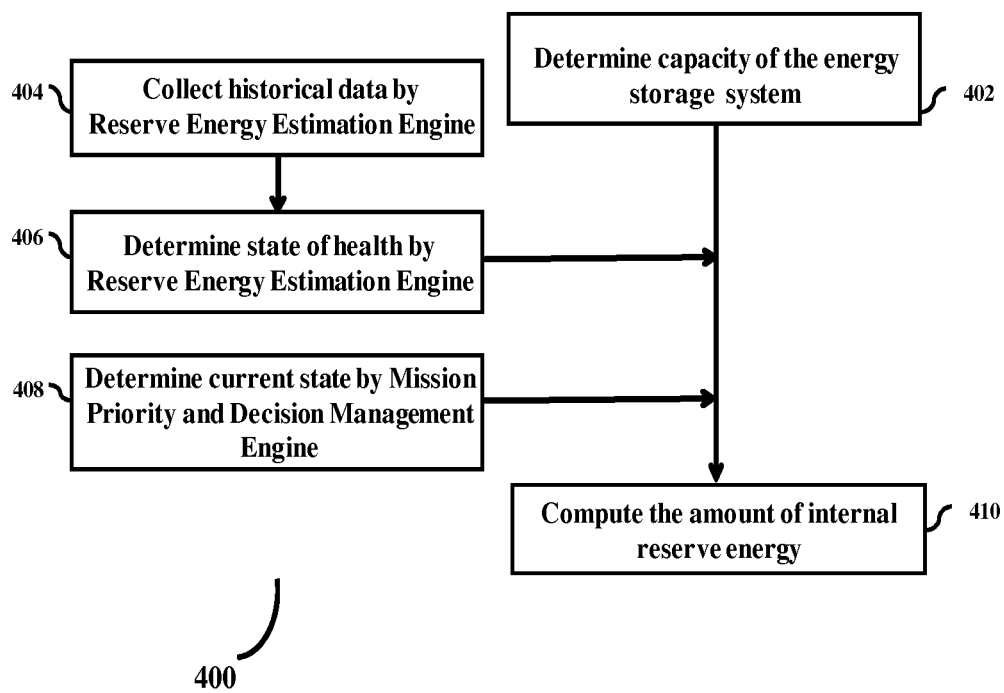
FIG. 4 is a flow diagram which shows different steps involved in the process of determining amount of internal reserve energy available in an energy storage system, using the Energy Management System (EMS), as disclosed in the embodiments herein.

FIG. 4 is a flow diagram which shows different steps involved in the process of determining amount of internal reserve energy available in an energy storage system 100s, using the Energy Management System (EMS), as disclosed in the embodiments herein. Initially, using the energy usage optimization module 101, the EMS 100 determines (402) capacity of the energy storage system 100s.

Further, using the REEE 202, the energy usage optimization module 101 collects (404) historical data pertaining to previously executed energy usage optimization processes. Further, by processing the historical data, the REEE 202 determines (406) state of health of the energy storage system 100s. Further, by using the MPDME 203, the energy usage optimization module 101 determines (408) current state of the energy storage system 100s. Further, based on the determined information pertaining to capacity, state of health, and current state of the energy storage system 100s, and other information such as, but not limited to age of the energy storage system 100s, recharging behavior of the energy storage system 100s, number of charge and discharge cycles the energy storage system 100s has experienced, and impedance of the energy storage system 100s, historic driving pattern, historic terrain pattern, and current driving pattern for determining amount of internal reserve energy available in an energy storage system 100s, the EMS 100 computes (410) amount of internal reserve energy available in the energy storage system 100s.

The various actions in method 400 may be performed in the order presented, in a different order or simultaneously. Further, in some embodiments, some actions listed in FIG. 4 may be omitted.

Figure 5:
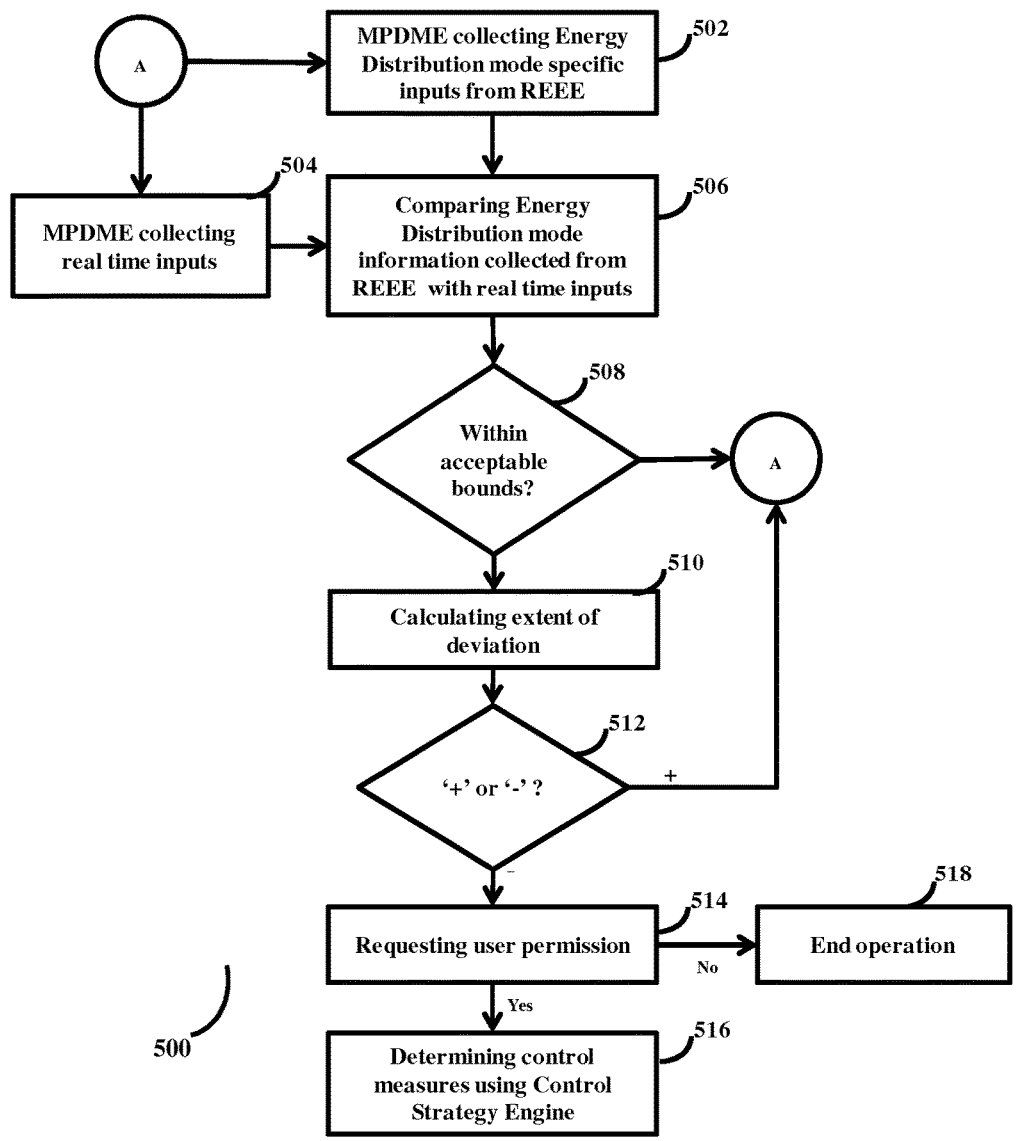
FIG. 5 is a flow diagram which shows different steps involved in the process of selecting an Energy Distribution Mode, using the Energy Management System (EMS), as disclosed in the embodiments herein.

FIG. 5 is a flow diagram which shows different steps involved in the process of selecting an Energy Distribution Mode, using the Energy Management System (EMS), as disclosed in the embodiments herein.

The energy usage optimization module 101 in the EMS 100 collects real time, and pre-configured inputs required for the energy usage optimization purpose. Further, by processing the collected inputs based on pre-configured settings/rules, the energy usage optimization module 101 selects an energy distribution mode, wherein different energy distribution modes indicates different energy distribution requirements based on pre-configured, and real time inputs collected by the system.

Further, the selected energy distribution mode is verified using the MPDME 203, wherein verifying the selected energy distribution mode may involves verifying whether the selected energy distribution mode matches pre-configured safety rules, by conducting a safety analysis. Verifying the selected energy distribution mode may further involve verifying whether the energy distribution mode matches user preference(s). For the verification purpose, the MPDME 203 collects (502) information pertaining to the selected energy distribution mode, as input from the REEE 202. The MPDME 203 further collects (504) at least one real time input using associated input devices such as sensors. For example, the real time input may be climate information, current health and state of the energy storage system 100s, amount of internal reserve energy available at that instant, and so on. Further, the MPDME 203 compares (506) the Energy Distribution mode specific information collected from the REEE 202 with the real time inputs and verifies the selected Energy Distribution Mode by verifying if the selected Energy Distribution Mode is within acceptable bounds in terms of safety and user preferences. If the verification process is successful, i.e. the selected Energy Distribution Mode is safe, and in line with user preferences, then the MPDME 203 continues the verification process based on real time input collected at further instances.

If any variation is detected, then the MPDME 203 calculates (512) extent of deviation. In various embodiments, the deviation may be positive or negative. The positive deviation indicates that the selected Energy Distribution Mode favors the requirements in terms of safety and user preferences, whereas a negative deviation indicates that the selected Energy Distribution Mode is not in line with the requirements in terms of safety and user preferences. If the deviation is positive, then the MPDME 203 continues the verification process based on real time input collected at further instances. If the deviation is negative, then the MPDME 203 requests user permission to initiate control measures to make the selected Energy Distribution Mode in line with the specified requirements. Upon receiving user permission, the MPDME 203 provides necessary input(s) for the CSE 204 to determine (516) at least one control measure, wherein the control measure may refer to a decision to control energy usage of at least one selected vehicle component. Another possible control measure could be that the CSE 204 replacing the selected Energy Distribution Mode with a default Energy Distribution Mode.

The various actions in method 500 may be performed in the order presented, in a different order or simultaneously. Further, in some embodiments, some actions listed in FIG. 5 may be omitted.

Figure 6:
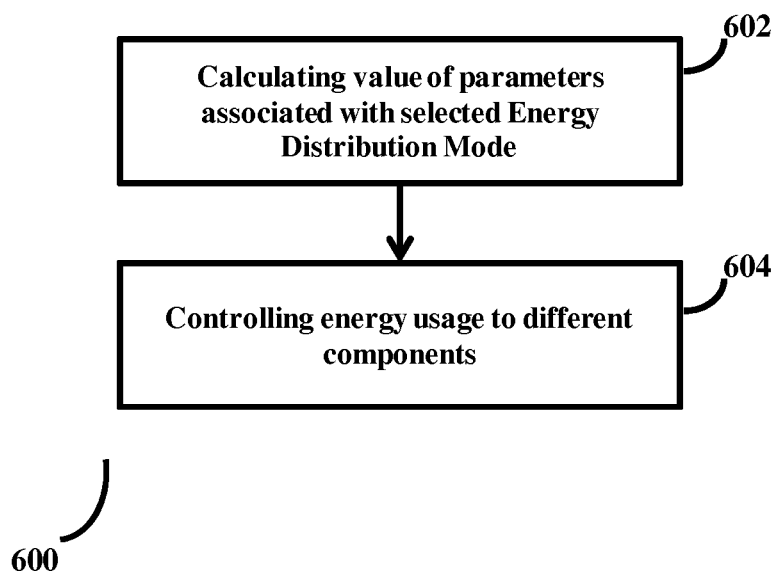
FIG. 6 is a flow diagram which shows different steps involved in the process of distributing energy among different components based on the selected Energy Distribution Mode, using the Energy Management System (EMS), as disclosed in the embodiments herein.

FIG. 6 is a flow diagram which shows different steps involved in the process of distributing energy among different components based on the selected Energy Distribution Mode, using the Energy Management System (EMS), as disclosed in the embodiments herein.

In this process, the CSE 204 calculates (602) value of all control parameters corresponding pertaining to selected components and corresponding energy requirements, as indicated in the selected Energy Distribution Mode, such that the control parameters indicate extent to which energy distribution is to be controlled to selected vehicle components. The control parameters thus calculated are then used to generate a distribution optimization profile. Further, based on the distribution optimization profile, and calculated value of each parameter, the CSE 204 in the energy usage optimization module 101 controls (604) energy distribution to selected components. The various actions in method 600 may be performed in the order presented, in a different order or simultaneously. Further, in some embodiments, some actions listed in FIG. 6 may be omitted.

In an example implementation scenario, if only 30% of energy is available in the energy storage system 100s, then the distribution optimization profile may be generated such that the energy is distributed according to priority of each component. In this scenario, components such as engine, headlight and so on, may be given higher priority and the energy usage optimization module 101 may ensure proper energy flow to these components by limiting or closing energy supply to other components such as infotainment systems.

Further, the energy usage optimization module 101 whether the selected distribution optimization profile matches rules defined as part of a safe use profile, by conducting a safety analysis. The safe use profile and associated rules define safe driving standards of the vehicle, based on various parameters. For example, the safe user profile may define a minimum/recommended value of temperature which is safe for the users of the vehicle. In another example, the safe use profile may, by considering current health status of the battery module, suggest amount of load to be given to the battery so that the system don't break down while in use. In an embodiment, the safety rules may be manually defined and configured by an authorized the user. In another embodiment, the energy usage optimization module 101 may automatically define such rules, using a dynamically learning capability.

If the selected distribution optimization profile is found to be unsafe, then the energy usage optimization module 101 may override settings associated with the selected distribution optimization profile to ensure that the profile matches specified safety rule (s). Value of each parameter, used for overriding the settings, may be pre-configured by an authorized user. If the selected distribution optimization profile is found to be in compliance with the safe use profile, then the energy usage optimization module 101 may use the same profile without any alteration.

Further, based on the final version of the distribution optimization profile, the energy usage optimization module 101 prioritizes energy distribution to selected components of the vehicle. Prioritization may involve deciding amount of energy to be supplied to each of the selected components, based priority value of each component. The priority value of each component may be pre-defined and configured with the energy usage optimization module 101, by considering on criticality of function handled by each component. For example, as engine is a critical component of the vehicle, it may be assigned a higher priority value so that constant and sufficient energy supply to the engine is ensured. The embodiments disclosed herein can be implemented through at least one software program running on at least one hardware device and performing network management functions to control the network elements. The network elements shown in FIG. 1a include blocks which can be at least one of a hardware device, or a combination of hardware device and software module.

The embodiment disclosed herein specifies a system for automated and prioritized energy distribution to various components of a vehicle. The mechanism allows prioritization of energy distribution, providing a system thereof. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the embodiment may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

We claim:

1. A method for controlling internal reserve energy usage in an energy system, said method comprising:

determining an amount of said internal reserve energy in said energy system, by a reserve energy estimation engine of an energy usage optimization module, wherein said determination of amount of internal reserve energy in said energy system comprises:
  determining a capacity of the energy storage system by collecting at least one of a data related to the energy storage system, by said reserve energy estimation engine;
  collecting a historical data relating to the energy storage system, by said reserve energy estimation engine;
  determining a state of health of the energy storage system based on the collected historical data, by said reserve energy estimation engine;
  determining a current state of the energy storage system, by a Mission Priority and Decision Management Engine of said energy usage optimization module; and
  computing the amount of internal reserve energy available below a threshold level based on at least one of the determined capacity, state of health, and current state of the energy storage system by said reserve energy estimation engine;
generating at least an energy distribution mode, by the reserve energy estimation engine, wherein said energy distribution mode comprises an energy estimation for at least one of a propulsion requirement and an auxiliary load requirement;
verifying said generated energy distribution mode, by a mission priority and decision management engine of said energy usage optimization module, wherein said verification of said energy distribution mode comprises:
  conducting a safety analysis of said energy distribution mode, wherein when said safety analysis is negative, said generated energy distribution mode is configured to be overridden by at least a default energy distribution mode; and
  verifying the energy distribution mode to be in line with at least a user preference;
calculating a value of at least one parameter associated with said generated energy distribution mode, by a control strategy engine of said energy usage optimization module;
creating a distribution optimization profile, wherein said distribution optimization profile possesses said calculated value of said at least one parameter associated with said generated energy distribution mode, by said reserve energy estimation engine; and
controlling said energy distribution to at least one component based on said at least one calculated value of said parameter and said distribution optimization profile, by said control strategy engine.

2. The method as claimed in claim 1, wherein said energy distribution mode is generated based on at least one of a pre-configured user input and a real time input.

3. The method as claimed in claim 1, wherein
said energy distribution mode comprises the energy estimation for said propulsion requirement and said auxiliary load requirement; and
said propulsion requirement and said auxiliary load requirement are arranged in an order of priority in said energy distribution mode.

4. The method as claimed in claim 1, wherein said safety analysis comprises at least one of possibility of the system reaching a destination, or a nearest charging station.

5. The method as claimed in claim 1, wherein said determination of amount of internal reserve energy in the energy storage system is based on at least one of a capacity of the energy storage system, an age of the energy storage system, a recharging behaviour of the energy storage system, a number of charge and discharge cycles the energy storage system has experienced, a historic usage pattern derived by collecting data representing at least one of historic driving pattern, a historic terrain pattern, a current driving pattern, or an impedance of the energy storage system.

6. A system for controlling internal reserve energy usage, said system comprising:
  an energy usage optimization module including an input/output (I/O) module;
  a reserve energy estimation engine;
  a mission priority and decision management engine;
  a control strategy engine;
  a memory module; and
  a battery module interface,
wherein
said Reserve Energy Estimation engine is configured to:
  determine an amount of said internal reserve energy in an energy system, wherein said determination further comprises:
    determining a capacity of the energy storage system by collecting at least one of a data related to the energy storage system;
    collecting a historical data relating to the energy storage system;
    determining a state of health of the energy storage system based on the collected historical data;
    determining a current state of the energy storage system; and
  computing the amount of internal reserve energy available below a threshold level based on at least one of the determined capacity, the state of health, or the current state of the energy storage system; and
  generate at least an energy distribution mode, wherein said energy distribution mode comprises an energy estimation for at least one of a propulsion requirement or an auxiliary load requirement;
said mission priority and decision management engine is configured to verify said generated energy distribution mode, wherein said verification of generated energy distribution mode comprises:
  conducting a safety analysis of said energy distribution mode, wherein when said safety analysis is negative, said generated energy distribution mode is configured to be overridden by at least a default energy distribution mode; and
  verifying the energy distribution mode to be in line with at least a user preference;
said control strategy engine is configured to calculate a value of at least one parameter associated with said generated energy distributed mode,
said reserve energy estimation engine is configured to create a distribution optimization profile, wherein said distribution optimization profile possesses said calculated value of said at least one parameter associated with said generated energy distribution mode; and
said control strategy engine is configured to control said energy distribution to at least one component based on said at least one calculated value of said parameter.

7. The system as claimed in claim 6, wherein said reserve energy estimation engine is configured to generate said energy distribution mode based on at least one of a preconfigured user input or a real time input.

8. The system as claimed in claim 6, wherein
said energy distribution mode comprises the energy estimation for said propulsion requirement and said auxiliary load requirement, and
said reserve energy estimation engine is configured to arrange said propulsion requirement and said auxiliary load requirement in an order of priority in said energy distribution mode.

9. The system as claimed in claim 6, wherein said safety analysis comprises at least one of possibility of the system reaching a destination, or nearest charging station.

10. The system as claimed in claim 6, wherein said mission priority and decision management engine is configured to determine the amount of internal reserve energy in the energy storage system based on at least one of a capacity of the energy storage system, an age of the energy storage system, a recharging behaviour of the energy storage system, a number of charge and discharge cycles the energy storage system has experienced, a historic usage pattern derived by collecting data representing at least one of historic driving pattern, a historic terrain pattern, a current driving pattern, or an impedance of the energy storage system.

* * * * *